May 7, 1963  E. T. CLINE ET AL  3,088,791
GRAFT POLYMERIZATION OF A VINYL MONOMER TO
A POLYMERIC SUBSTRATE BY LOW
TEMPERATURE IRRADIATION
Filed Feb. 6, 1959

INVENTORS
EDWARD T. CLINE
DAVID TANNER

BY *Carl A. Hechmer*

ATTORNEY

United States Patent Office 3,088,791
Patented May 7, 1963

3,088,791
**GRAFT POLYMERIZATION OF A VINYL MONO-
MER TO A POLYMERIC SUBSTRATE BY LOW
TEMPERATURE IRRADIATION**
Edward Terry Cline and David Tanner, Wilmington, Del.,
assignors to E. I. du Pont de Nemours and Company,
Wilmington, Del., a corporation of Delaware
Filed Feb. 6, 1959, Ser. No. 791,626
11 Claims. (Cl. 8—115.5)

This invention is concerned with a new process for adhering an organic compound to a shaped organic polymer.

Certain effects of high energy radiation on high molecular weight organic polymers are known. K. H. Sun (Modern Plastics, 32, 141 and following (1954)), has reviewed this subject and summarized it in part as follows:

"Since high polymers are covalent substances, the effect of radiation is largely caused by ionization and electronic excitation. These processes cause instantaneous flow of electric current and the breakage and rearrangement of the chemical bonds, and the formation of free radicals. Consequently, chemical reactions are initiated. The phenomenological results include gas liberation, double bond formation and elimination, degradation, polymerization, cross-linking and vulcanization, vitrification, hydrogenation, and others. As a consequence many important physical properties are changed."

The use of high energy radiation in effecting interaction between organic polymers and dissimilar organic substances has been restricted for the most part to the simultaneous irradiation of both components.

There has now been discovered a process whereby reactive sites produced by irradiating a shaped polymer substrate are retained for long periods of time by keeping the polymer at a low temperature during and after the irradiation. After such irradiation, modifying agents are linked to the shaped polymer substrate by contacting it with a vinyl monomer which grafts onto the polymeric substrate by vinyl polymerization mechanisms, forming a graft copolymer.

It is an object of the present invention to provide a novel and useful process for the grafting of a vinyl polymer to a shaped organic substrate.

Another object is to provide a shaped organic substrate which retains its ability to initiate vinyl polymerization for extended periods.

These and other objects will become apparent in the course of the following specification and claims.

By the term "shaped organic substrate" as used herein is meant a shaped polymer of the class consisting of a synthetic condensation polymer, a synthetic addition polymer, a natural carbonaceous cellulose, protein, and polyisoprene polymer. Copolymers as well as homopolymers are, of course, included.

By the term "synthetic condensation polymer" is meant a polymer which can be formed by polymerization with elimination of small molecules such as HCl, $H_2O$, NaCl, $NH_3$ and the like. Among such polymers may be mentioned polyamides, polyureas, polyurethanes, polyesters, polyoxymethylenes, polyethers(epoxy polymers), polyacetals, polysulfonamides, polyorganosiloxanes, and the like and copolymers of such materials; such polymers usually yield a suitable monomer when hydrolyzed. By a "synthetic addition polymer" is intended a polymer which can be formed by vinyl polymerization, i.e., polymerization which proceeds by combination of an unsaturated monomer with itself or with other unsaturated monomers by linkage at the olefinic bonds. Among suitable monomers for such polymerization may be mentioned styrene, the acrylic esters, vinyl chloride, vinylidene chloride, vinyl acetate, the vinyl ketones, the vinyl ethers, divinyl ether, the halogen, sulfur, nitrogen and phosphorus containing vinyls, the vinyl silanes, ethylene, propylene, the allyl esters, acrylonitrile, methacrylonitrile, 1,3-butadiene, isoprene, chloroprene, 2,3-dimethyl-1,3-butadiene and the like. Linear, branched, isotactic and atactic polymers are highly suitable. The concepts "a natural carbonaceous cellulose, protein and polyisoprene polymer" comprise those carbonaceous polymers formed in nature; the preferred polymers are those which in themselves are fibers or film or whose derivatives may be manufactured into fiber or film form. Among such materials is included cotton, flax, jute, silk, wool, fur, hair, rubber, leather, wood, regenerated cellulose, cellulose acetate and the like.

By "graft copolymer" is meant a polymer which is modified, after polymerizing and shaping, by chemically bonding thereto, molecules of a chemically dissimilar organic compound.

"Vinyl monomer" as used herein is intended to include those organic compounds which have aliphatic unsaturation, and which may be employed to form addition homopolymers. Also included are those unsaturated compounds which, although not themselves homopolymerizable (e.g., maleic acid), copolymerize with other vinyl monomers. The term is also intended to include compounds with acetylenic unsaturation.

By "irradiation" is meant the process by which energy is propagated through space, the possibility of propagation being unconditioned by the presence of matter, as distinguished from mere mechanical agitation in a material medium such as is characteristic of energy produced by a sonic or ultrasonic transducer, although the speed, direction and amount of energy transferred may be thus affected.

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention, although energies of 50,000 ev. and over are preferred. The ionizing radiation of the process of this invention is generally classed in two groups: high energy particle radiation, and ionizing electromagnetic radiation. The effect produced by these two types of radiation is similar, the essential requisite being that the incident particles or photons have sufficient energy to break chemical bonds and generate free radicals.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

According to the present invention, the shaped organic polymer substrate is irradiated by means of ionizing radiation at a low temperature i.e. preferably below room temperature and particularly between about −273° C. and 0° C., contacted with a vinyl monomer at a low temperature and thereafter exposed to a temperature at which the latent free radicals become activated and initiate vinyl polymerization.

The steps of the process are shown in the FIGURE.

Figure 1:
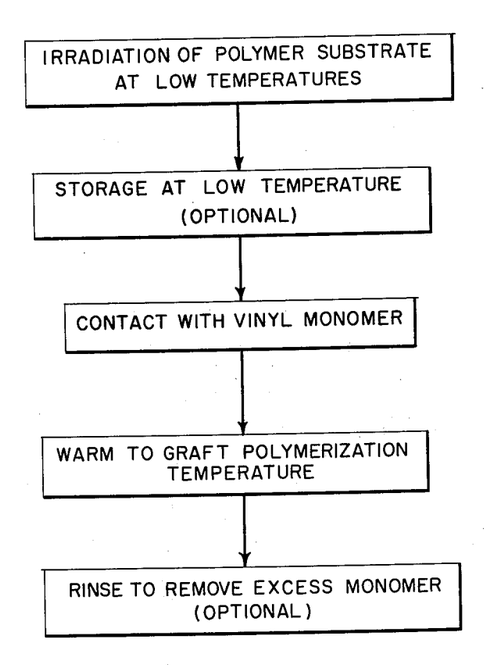

The manner in which the irradiated polymer substrate is contacted with the vinyl monomer is not critical. The shaped substrate may be exposed to the monomer as a vapor, fog, spray or a liquid dip. If the monomer is a fusible solid, the substrate may be melt coated. Alternatively, it may be desirable to apply the monomer to the substrate as a solution, by spraying, dipping, padding or the like. It is important to keep the activated substrate at a low temperature until it is contacted with the vinyl monomer. Contact at the temperature of irradiation and/or storage, i.e., below about 0° C. is preferred. Higher contact temperatures, around 10° C. to 15° C. may be employed. However, the polymerization is less efficient when the contact is at the higher temperatures, especially if the substrate is exposed to the higher temperature for a substantial period.

Paramagnetic resonance spectra indicate that the radiation produces free radicals or active sites in the polymer molecule, to which the vinyl monomer attaches itself, initiating a normal vinyl polymerization.

The free radicals formed by irradiation are ordinarily very reactive with oxygen and if the radiation takes place at room temperature in the presence of air the activity thereby induced is rapidly lost. However, when the irradiation is carried out at low temperatures, in accord with this invention, the free radicals are preserved as long as the polymer substrate is kept at a suitably low temperature. In general, the lower the temperature, the longer an acceptable level of activity can be maintained (as shown in Example VIII). At a given irradiation temperature, the efficiency of preservation of the free radicals is increased somewhat by the exclusion of oxygen, for example by maintaining the sample in a vacuum, or blanketed by an inert gas; usually, this is not necessary.

When the activated substrate is contacted with the monomer, and the temperature is allowed to rise, a reaction takes place (e.g., at room temperature or elevated temperature) which appears to follow the mechanisms of vinyl polymerization, the usual effects of temperature, reagent concentration, activators and the like have been noted. It is believed that the vinyl monomer and the polymer formed therefrom is attached to the substrate as a side chain of the polymer of the substrate. The time of contact with the monomer is not critical, but preferably should be long enough for a satisfactory degree of grafting to occur. As shall be shown in the examples which follow, the vinyl grafts cannot be removed from the shaped substrate by solvents which would ordinarily dissolve polymer formed in the conventional way from said vinyl monomer.

The following examples are cited to illustrate the invention. They are not intended to limit it in any manner.

EXAMPLE I

A swatch of taffeta fabric (9 inches x 7 inches) prepared from 40 denier 34 filament polyhexamethylene adipamide yarn is contacted with Dry Ice and passed 20 times under the electron beam from a 2 mev. Van de Graaff electron accelerator. The Van de Graaff accelerator is operated at a beam-out current of 250 microamperes which gives, at a window to sample distance of 10 centimeters and a scan width of 20 centimeters, an exposure rate at the sample of 12½ watt seconds per square centimeter per pass, when the sample is traversed back and forth under the beam at a rate of 2 centimeters per second.

This exposure rate is equivalent to a dose (per pass) of about 1 million "rad" (abbreviated "Mrad"), where a "rad" is that amount of irradiation which results in an energy absorption of 100 ergs per gram of water or equivalent absorbing material. The exposure, in this case, is 250 watt sec./cm.$^2$. The activated nylon thus prepared has a bright yellow color. This fabric is then transferred to a Dewar flask containing Dry Ice. After storage for 48 hours at this temperature (about −80° C.) the fabric is placed in a beaker containing 50 ml. of a solution of 10 parts of sodium styrene sulfonate (monomer) dissolved in 90 parts of water, held at room temperature. The fabric and the sodium styrene sulfonate solution are allowed to stand for about 16 hours at room temperature. Almost immediately after submersion of the fabric in the solution the bright yellow coloration of the nylon begins to fade. When inspected after 16 hours, it is found that the original whiteness of the fabric has been restored. The fabric is then subjected to a series of standard washings with the results shown in Table 1 below. The standard washing to which the sample is subjected consists of a 30 minute immersion in 70° water containing 0.5% alkyl alcohol sulfate detergent (sold under the trademark "Tide" by Procter and Gamble Co., Cincinnati, Ohio) in an agitator washer. In some cases (as indicated) the "Tide" detergent is replaced by sodium oleate soap. After a series of standard washings the static propensity of the dry fabric is determined in terms of direct current resistance measured at 78° F. in a 50% relative humidity atmosphere. The resistivity is given as the logarithm (to the base 10) of the resistance in ohms. High values indicate a tendency to acquire and retain a static charge.

*Table 1*

| | |
|---|---|
| Number of passes while over Dry Ice | 20 |
| Total exposure, watt sec./cm.$^2$ | 250 |
| Storage in Dry Ice, hr. | 48 |
| Subsequent reaction time at room temp., hr. | 16 |

| | Percent weight gain | Log R |
|---|---|---|
| After 2 "Tide" washes | 12.0 | 10.5 |
| After 20 "Tide" washes | 12.0 | 10.9 |
| After 3 soap washes | 12.0 | 10.7 |

A control swatch of the same fabric is treated in exactly the same way except that it is allowed to stand at room temperature for several hours after irradiation at low temperature and prior to submersion in monomer. During storage at room temperature, the yellow color fades to its original whiteness. After contacting with the sodium styrene sulfonate for about 16 hours, followed by rinsing, this control sample shows no weight gain, and has a log resistivity of 13.3.

EXAMPLE II

Four swatches of the nylon fabric of Example I are irradiated to various degrees while resting on Dry Ice as shown in Table 2. The conditions of irradiation are the same as those of Example I. After irradiation the samples are stored for 50 hours in a Dewar flask on Dry Ice. They are then immersed, along with a non-irradiated control sample, in a solution of 20 parts of potassium acrylate (obtained as a powder, containing a minor amount of methylene blue inhibitor, from Monomer-Polymer Corp., Leominster, Mass.) and 80 parts of water. The samples remain immersed in the solution for 16 hours. After removing and being subjected to two standard washings in "Tide" detergent, the weight gain of each sample and its corresponding resistivity is measured, with results as shown in Table 2.

*Table 2*

| Sample | Number of passes while over Dry Ice | Total exposure watt sec./cm.$^2$ | Weight gain, percent | Log R, after 2 "Tide" washings |
|---|---|---|---|---|
| 2A | 5 | 62.5 | 22.0 | 11.8 |
| 2B | 10 | 125 | 31.0 | 9.6 |
| 2C | 20 | 250 | 81.0 | 9.5 |
| 2D | 40 | 500 | 111.0 | 8.6 |
| 2E | 0 | 0 | 0 | 13.3 |

It is thus apparent that increasing amounts of the vinyl monomer are grafted to the nylon substrate as the radiation exposure is increased. The increasing amount of polymer grafting is also shown by the decrease in resistivity.

EXAMPLE III

Swatches 3A to 3E inclusive of the fabric of Example I are exposed to irradiation as in Example I, while resting on Dry Ice. The exposure in each case is 40 passes or a total of 500 watt seconds per square centimeter. The samples are then left on Dry Ice for 48 hours and thereafter exposed for at least 16 hours in the monomer solutions listed in Table 3. The observed weight increases after washing are also shown in Table 3. Control swatches given the same exposure to monomer without the irradiation step show no increase in weight after washing.

*Table 3*

| Sample | Treating agent | Percent weight increases |
|---|---|---|
| 3A | 20% calcium acrylate in water | 4.0 |
| 3B | 20% sodium salt of propene sulfonic acid in water | 1.0 |
| 3C | 100% methoxydodecaethyleneoxy methacrylate | 0.5 |
| 3D | Saturated aqueous fumaric acid | 1.0 |
| 3E | 10% itaconic acid in water | 8.0 | in the vinyl monomer. None of these samples show any weight gain after the extraction treatment.

EXAMPLE V

A series of test fabrics identified in Table 5 are prepared and irradiated in contact with Dry Ice, at the exposure indicated in Table 6.

*Table 5*

| Sample | Polymer | Yarn used in test fabric |
|---|---|---|
| 5A | Polyethylene terephthalate | Continuous filament yarn. |
| 5B | do | Spun (staple) yarn. |
| 5C | Polyacrylonitrile | Continuous filament yarn. |
| 5D | do | Spun (staple) yarn. |
| 5E | Cellulose acetate | Continuous filament yarn. |
| 5F | Cotton | Spun (staple) yarn. |
| 5G | Silk | Continuous filament yarn. |
| 5H | Wool | Spun (staple) yarn. |

*Table 6*

| Sample | Number of passes | Total watt sec./cm.$^2$ | Storage in Dry Ice, hr. | Treating agent | Wash treatment | Log R after solvent wash — Test sample | Log R after solvent wash — Control |
|---|---|---|---|---|---|---|---|
| 5A [1] | 40 | 500 | 72 | 2,5-di-chlorostyrene | Benzene acetone | | |
| 5B | 20 | 250 | 240 | Potassium acrylate, 20% aq | 2 "Tide" | 11.5 | 13.3 |
| 5C | 20 | 250 | 240 | Sodium styrene sulfonate 10% in H$_2$O | do | 11.8 | 13.3 |
| 5D | 20 | 250 | 240 | Potassium acrylate, 20% in H$_2$O | do | 11.0 | 13.3 |
| 5E | 5 | 62.5 | 240 | K acrylate, 20% | do | 9.8 | 13.3 |
| 5F | 5 | 62.5 | 240 | do | do | 9.5 | 10.5 |
| 5G | 20 | 250 | 240 | Acrylic acid, 100% | Water wash | 12.6 | 13.3 |
| 5H | 20 | 250 | 240 | do | 2 "Tide" | 11.1 | 13.3 |

[1] Resistivity not measured. Test sample gained 0.5% in weight, no weight gain for control.

EXAMPLE IV

Five swatches of the fabric of Example I are irradiated under the conditions of Example I, utilizing 40 passes for a total exposure (for each swatch) of 500 watt seconds per square centimeter. The samples are stored over Dry Ice for 504 hours after which they are immersed in various vinyl monomers as shown in Table 4. The samples are exposed to the vinyl monomers at room temperature for a period of about 48 hours reaction time. Liquid reagents without diluent are used in each case. After the 48 hour exposure, samples are removed from the monomer and extracted with solvents known to be effective for the particular vinyl polymer. The extraction is carried out by repeated immersion, using fresh portions of solvent at 70° C., agitating each portion for a period of up to one hour. In the case of Sample 4A, the extraction with acetone is followed by a 24-hour Soxhlet extraction with dimethyl formamide. Two different solvents, as noted, are used successively in Sample 4C. After the solvent extraction the residual weight gain (in percent) is determined. The results are indicated in Table 4.

*Table 4*

| Sample | Treating agent | Extraction treatment | Percent weight gain |
|---|---|---|---|
| 4A | Acrylonitrile | Acetone | 5.2 |
| 4B | Vinyl acetate | do | 2.6 |
| 4C | 2,5-dichlorostyrene | Benzene; acetone | 1.3 |
| 4D | Vinylidene chloride | Acetone | 3.5 |
| 4E | Vinylbutyl ether | do | 1.7 |

A corresponding series of control samples are irradiated over Dry Ice for the same total exposure, but are stored in air at room temperature for 16 hours before immersing After irradiation, samples are stored over Dry Ice for the indicated times and are then exposed to various treating agents. After exposure to the treating agents for 16 hours, the samples are subjected to a solvent wash, or standard "Tide" washes as indicated and are thereafter tested for resistivity. The results of the resistivity test are also indicated in Table 6 with similar results for the control sample which is exposed to the vinyl monomer, not irradiated, but washed.

EXAMPLE VI

This example illustrates that the second step of the reaction, that in which the vinyl monomer combines with the irradiation-activated substrate, can often advantageously be carried on at elevated temperatures.

A series of samples of the fabric of Example I, identified as 6A to 6H inclusive, are laid on Dry Ice and each is irradiated to a total exposure of 125 watt seconds per square centimeter in the apparatus and under the conditions of Example I. The samples are stored over Dry Ice for 48 hours, and are then exposed to various treating agents. One set of samples is exposed to the treating agent indicated in Table 7 for 3 hours at 60° C. by submerging the fabric sample immediately after cold storage, in the grafting agent-solution pre-heated to 60°. The sample is then allowed to stand at room temperature for an additional 33 hours. A second set of samples is exposed by submersion in the indicated treating agents for 36 hours at 20° C. All samples are thereafter subjected to extraction using a Soxhlet extractor for a 24 hour period. The solvents utilized are listed in the table. After the extraction step the weight gain of the fabric is determined.

Table 7

| Sample | Treating agent | Reaction time, hr. 20°C. | Reaction time, hr. 60°C. | Extraction solvent | Weight gain, percent |
| --- | --- | --- | --- | --- | --- |
| 6A | Acrylonitrile (100%) | 36 | | $CH_3OH$ | 3.0 |
| 6B | ----do---- | | 3 | $CH_3OH$ | 6.7 |
| 6C | Na styrene sulfonate 20% in $H_2O$. | 36 | | $H_2O$ | 1.9 |
| 6D | ----do---- | | 3 | $H_2O$ | 7.4 |
| 6E | 2,3-dimethylbutadiene (100%). | 36 | | $CH_3OH$ | −0.4 |
| 6F | ----do---- | | 3 | $CH_3OH$ | 5.9 |
| 6G | Vinyl triethoxysilane (100%). | 36 | | $C_2H_5OH$ | 0.0 |
| 6H | ----do---- | | 3 | $C_2H_5OH$ | 0.3 |

It is apparent from these results that it is often beneficial to carry out the second step of the treatment of this invention at elevated temperatures, preferably between about 50° C. and 100° C. whereby not only is an increased thickness of coating produced, but in some cases vinyl monomers which are not appreciably reactive at room temperature become satisfactorily reactive at the elevated temperature, at least in part because of increased rate of reaction.

Although it is possible to graft vinyl monomers to shaped organic polymer substrates by simultaneous irradiation of the substrate in contact with the vinyl monomer, there are advantages to carrying out the process in two steps, as taught herein, i.e., irradiation-activation of the substrate at low temperatures, followed by exposing the active substrate to the monomer. Among these advantages, it has been found that there is less tendency for side reactions, if irradiation of the substrate takes place at low temperatures. The irradiation substrate has much less tendency to permanently discolor. The physical properties of polymers irradiated at low temperatures remain more nearly unchanged as compared to those of polymers which are irradiated at about 20° C. The two-step process is especially advantageous for grafting gaseous monomers, as shown hereinafter. Another advantage of the two-step process is that the polymer substrate, activated at low temperature, may be stored indefinitely as long as it is maintained at the low temperature; thus, it may be reacted at another time and place at the convenience of the manufacturer. Moreover, the grafting agent itself is not exposed to the irradiation. This has the advantage of allowing use of grafting agents which are affected by irradiation, for example, through decomposition, polymerization, or other undesirable side reactions. This also conserves all of the irradiation energy for formation of free radicals on polymer substrates, rather than dissipating it by absorption by the grafting agent. The advantages of low temperature irradiation in preserving the strength of polyhexamethylene adipamide yarn are shown by the following example.

EXAMPLE VII

Two skeins of 40 denier, 13 filament, polyhexamethylene adipamide yarn are prepared and treated as follows: Skein 7A is irradiated while resting on Dry Ice under the same conditions as used in Example I. The exposure is 60 passes. The skein is then plunged into a 10% aqueous solution of sodium styrene sulfonate, removed after one minute, and alowed to stand overnight at room temperature, wrapped in aluminum foil. It is then soaked in distilled water to remove excess monomer. The skein is next dried and tested. The skein 7b is first immersed in 10% aqueous sodium styrene sulfonate solution, removed after 1 minute and is then allowed to stand overnight wetted with the monomer and wrapped in aluminum foil. It is thereafter given the same irradiation exposure as 7A, but at room temperature. The skein 7B is next soaked in distilled water to remove excess monomer, dried and tested, with the results shown in Table 8.

Table 8

| | Skein 7A | Skein 7B |
| --- | --- | --- |
| Process | 2-step | 1-step |
| Irradiation temperature | Low | Room |
| Breaking strength before irradiation, g | 197 | 192 |
| Breaking strength after treatment, g | 162 | 124 |
| Percent strength retained | 82 | 65 |

The irradiation step of this invention has been described and carried out in the presence of Dry Ice. Dry Ice is used merely for convenience because of its ready availability. Its sole function is that of providing a low temperature environment. The presence of the carbon dioxide vapor which is continually evolved is not required. For example, when polymer substrate samples (e.g., fabric) are enclosed in glass tubes containing pure oxygen, the substances can be activated by irradiation at low temperatures for subsequent reaction with vinyl monomers very effectively and almost as efficiently as when they are blanketed by the vapor evolved by the Dry Ice.

The effect of the storage temperature on the duration of reactivity of the free radicals produced by irradiation is illustrated in the following example.

EXAMPLE VIII

Samples of the 66 nylon fabric of Example I (coded 8A to 8M) are placed in polyethylene bags, containing also air, and are irradiated on a bed of Dry Ice following the procedure of Example I. The exposure is 250 watt sec./cm.$^2$. The samples are then stored at constant temperatures for the periods indicated in Table 9, after which each sample is immersed in a solution of 20 parts potassium acrylate and 80 parts water. After allowing upwards of 40 hours to be sure the reaction is complete, the samples are given 10 standard washings and the percent weight gains are determined, based on the original weight of the dry samples. The results are shown in the table along with results for two controls, 8L and 8M.

Table 9

| Sample | Temp. of storage, °C. | Storage time | Percent weight gain after 10 standard "Tide" washes |
| --- | --- | --- | --- |
| 8A | −80 | 1 hr | 68.0 |
| 8B | −80 | 24 hrs | 67.0 |
| 8C | −15 | 1 hr | 87.0 |
| 8D | −15 | 24 hrs | 57.0 |
| 8E | 0 | 1 hr | 71.0 |
| 8F | 0 | 5 hrs | 34.0 |
| 8G | 0 | 24 hrs | 4.9 |
| 8H | 20 | 3 min | 67.0 |
| 8I | 20 | 1 hr | 34.5 |
| 8J | 20 | 5 hrs | 1.1 |
| 8K | 20 | 24 hrs | 0.9 |
| 8L | Irradiation but no treatment | | 0.6 |
| 8M | No irradiation; treated with potassium acrylate. | | 0.5 |

From the above it is apparent that the irradiation activation of the substrate lasts longer when it is kept below room temperature until exposed to the vinyl monomer. The activity drops to an almost insignificant amount in less than 5 hours at room temperature (20° C.), whereas at 0° C. appreciable activity persists for over 24 hours.

EXAMPLE IX

Portions of the same polyethylene terephthalate fabric used for Sample 5A are placed on a bed of Dry Ice, and irradiated in 40 passes in the equipment of Example I for a total exposure of 500 watt sec./cm.$^2$. The samples are stored in Dry Ice for 3 hours, and are then dropped into various liquid vinyl monomers at 80° C. as indicated in Table 10. A non-irradiated control sample is also immersed in each of the monomers. After immersion for 2 hours at 80° C., each pair (sample and control) is Soxhlet-extracted for 24 hours, using the solvent indicated. Weight changes are then determined on the dried swatches.

Table 10

| Irradiation | | Monomer | Solvent | Weight gain, percent |
|---|---|---|---|---|
| Sample | Passes | | | |
| 9A | 40 | Acrylamide | Water | +2.1 |
| 9B | 0 | ...do | ...do | +0.1 |
| 9C | 40 | 2-chlorobutadiene | Toluene | +7.0 |
| 9D | 0 | ...do | ...do | +2.1 |
| 9E | 40 | Acrylonitrile | Dimethylformamide | +6.3 |
| 9F | 0 | ...do | ...do | −2.1 |

EXAMPLE X

A portion of the nylon fabric of Example I (coded 10A) and a swatch of the polyethylene terephthalate fabric of Example V (Item 5A) coded 10B, are sealed in a glass tube which has a wall thickness of 0.043 inch. The tube is evacuated and sealed. It is then cooled in Dry Ice and irradiated at a temperature below −50° C. with 2 mev. electrons at 250 microamperes for a total of 125 watt sec./cm.$^2$, while the tube is half submerged in the Dry Ice. The tube is stored at −80° C. for about 3 hours and is then further evacuated while still cold. A portion of degassed methyl acrylate is admitted to the bottom of the cold tube so that the fabrics are contacted only by the vapor. The assembly is stored in the dark at about 25° C. for 2.8 days. The fabrics are stiff when removed from the tube. They are then extracted with benzene for about 5 hours in a Soxhlet extractor, wetted out with water, conditioned overnight at 50% relative humidity and 23° C. and then weighed. The nylon fabric sample 10A shows a weight gain of 142% and the polyester fiber fabric 10B shows a weight gain of 73%. A control swatch of nylon fabric similarly treated with methyl acrylate vapor at reduced pressure without prior irradiation shows only 0.6% gain in weight.

Another set of nylon and polyethylene terephthalate fabrics, coded 10C and 10D, respectively, are placed in an evacuated tube and are irradiated below −50° C. as before, and are stored at −80° C. for about 4 hours. Vinyl acetate monomer is then admitted to the bottom of the cold tube, which is then stored in the dark at about 25° C. for 2.8 days. The fabrics are extracted with benzene, wetted out and conditioned as above. The nylon fabric 10C shows a weight gain of 9.0% and the polyester fiber fabric 10D shows a weight gain of 12.5%.

EXAMPLE XI

A sample of polyethylene film 0.004 inch thick is laid on a bed of Dry Ice and irradiated in the equipment of Example I, with an exposure of 20 passes. The film is stored for 2 hours on a bed of Dry Ice and is then immersed in a solution of 20% potassium acrylate in water. The film remains in this solution at room temperature for 36 hours. It is then extracted with water at a temperature of 50° to 60° C. After the extraction treatment, the film is found to have a weight gain of 9.5%. It is also colored blue due to the presence of a minor amount of methylene blue which is present in the potassium acrylate solution. Its log R value is 11.2 as compared to a value of 13.3 for a non-irradiated control. The non-irradiated control, which has been contacted with the potassium acrylate solution and thereafter given the same extraction treatment as the test sample, is found to have a weight loss of 0.2%.

EXAMPLE XII

Portions of the original film of Example XI are coded 12A to 12G inclusive. Each portion of film is given the irradiation exposure of Example XI, while resting on a bed of Dry Ice. After storing for 2 hours on Dry Ice, they are immersed in vinyl monomers as shown in Table 11. After 36 hours exposure to the vinyl monomers at room temperature, the film samples are rinsed 5 times in hot (50° C.) methyl alcohol, dried, and their weight gain determined. A similar series of control samples which have not been irradiated but have been given the same exposure to vinyl monomer, followed by the extraction, are shown for comparison.

Table 11

| Film sample | Treating Agent | Percent Weight Gain | |
|---|---|---|---|
| | | Test | Control |
| 12A | Acrylonitrile | 55.0 | +0.3 |
| 12B | Methyl acrylate | 24.0 | +4.2 |
| 12C | Methacrolein | 4.3 | −0.1 |
| 12D | Vinylidene chloride | 4.6 | −1.2 |
| 12E | Vinyl acetate | 4.5 | −1.6 |
| 12F | 2-vinyl pyridine | 293 | −1.4 |
| 12G | 4-vinyl pyridine | 202 | −0.8 |

EXAMPLE XIII

A series of strips 4 inches x 1 inch are prepared from typical polyhexamethylene adipamide, silk, polyacrylonitrile, wool, cellulose acetate and cotton fabrics, and polyethylene film. Each strip is folded into a package about 1 inch x 1 inch, the packages are combined into a pile, and the whole is enclosed in an aluminum foil wrapper. The foil wrapped package is cooled in Dry Ice for 36 hours, and is then irradiated with X-rays while resting on a bed of Dry Ice, using a 2 mev. Van De Graaff electron accelerator, operated so that the electrons impinge on a gold target, generating X-rays which are directed onto the pile of samples. The distance of sample to tube window is 2 cm. The tube voltage is 2 mev., the current is 250 microamps, and the radiation dosage is about 2 Mrad per hour.

After an irradiation exposure of 8 hours, the samples are stored for 60 hours at Dry Ice temperatures (i.e., about −80° C.). The samples are then treated as described in the following examples.

EXAMPLE XIV

Samples treated as described in Example XIII are immersed in a solution of 20 parts sodium styrene sulfonate in 80 parts water at room temperature for 48 hours, as shown in Table 12. Upon removal the samples are rinsed thoroughly with agitation in several changes of 70° C. distilled water (30 minutes each change) and dried. The percent weight gain and log R is determined. Comparative values are given for control fabrics which have been given the same treatment, except for the irradiation step.

Table 12

| Sample | Fabric | Weight gain, percent | | Log R | |
|---|---|---|---|---|---|
| | | Test | Control | Test | Control |
| 14A | 66 nylon [1] | 12.2 | 0 | 8.9 | 13.3 |
| 14B | Wool | ([2]) | ([2]) | 10.8 | 11.8 |
| 14C | Silk | 6.0 | −1.2 | 10.5 | 12.8 |

[1] Polyhexamethylene adipamide.  [2] Not measured.

EXAMPLE XV

Fabric and film samples treated as in Example XIII are immersed in vinyl monomers or monomer solutions, for a period of about 48 hours. Upon removal the samples are rinsed and dried as in Example XIV, and the weight gain determined (Table 13). Results for similarly treated but non-radiated controls are also presented.

Table 13

| Sample | Fabric | Monomer | Weight gain, percent | |
|---|---|---|---|---|
| | | | Test | Control |
| 14A | 66 nylon [1] | 20% sodium acrylate in water. | 5.9 | 1.0 |
| 14B | ____do [1] | Saturated aqueous itaconic acid. | 4.9 | 0.5 |
| 14C | Cellulose acetate | 20% sodium styrene sulfonate. | 2.4 | −0.9 |
| 14D | Polyethylene (film). | 20% sodium styrene sulfonate. | 0.8 | −0.4 |
| 14E | Polyacrylonitrile | Liquid methoxydodecaethyleneoxy methacrylate. | 0.5 | 0.0 |

[1] Polyhexamethylene adipamide.

EXAMPLE XVI

Two cotton swatches treated in Example XIII are immersed in 20% aqueous sodium styrene sulfonate and in 20% aqueous sodium acrylate, respectively. After washing and drying, as in Example XIV, both have a stiffer, bulkier hand, as compared to a similarly treated but non-irradiated control.

EXAMPLE XVII

A series of nylon taffeta swatches (2.4 g. each) is irradiated at a temperature of −80° C., as described in Example I, to a total dose of 25 Mrad. The sample coded 17A is immersed in the solution indicated in Table 14, then sealed in a pressure bottle, at room temperature. Samples 17B and 17D are each placed in a precooled pressure bomb, to which the indicated vinyl monomer is admitted as a gas, to the indicated pressure. The temperature is then increased also as listed in the table. Sample 17C is placed in a pressure bottle containing the aqueous borax, to which is added 10 grams of 1,2-trifluoromethylethylene. The temperature of each sample-monomer combination is raised to the indicated level, and is maintained for 12 hours. The samples are then removed and extracted with a solvent for the polymerized monomer. After 12 hours extraction, the samples are dried over $P_2O_5$ and the weight gain is determined, as indicated in Table 14.

Table 14

| Sample | Monomer | Solvent System | Grafting | | Weight Gain, Percent |
|---|---|---|---|---|---|
| | | | Temp., °C. | Press., p.s.i.g. | |
| 17A | Vinyl chloride | 20% $H_2O$, 35% $CH_3OH$, 45% vinyl chloride. | 25 | | 11.7 |
| 17B | Tetrafluoroethylene. | 5% aqueous borax. | 90 | 500 | 9.26 |
| 17C | 1,2(trifluoromethyl)ethylene. | ____do | 70 | | 1.2 |
| 17D | Vinyl fluoride | 5% aqueous $Na_2CO_3$. | 80 | 3,500 | 24 |

An examination of the grafted fabrics show that in every case a "bulk" modification is obtained, that is, the monomer is grafted throughout the bulk of the polymer substrate and not merely upon its surface.

EXAMPLE XVIII

Following the procedure of Example I, scoured pieces of 66 nylon taffeta measuring 7 x 8 inches are irradiated at Dry Ice temperature, using 2 mev. electrons. The doses are indicated in the table. After irradiation, each chilled sample is dropped into an autoclave prepared according to the following procedure. The autoclave is cooled with Dry Ice-methanol mixture, purged with nitrogen, then the specified reagents plus the irradiated fabrics are added, before adding the vinyl monomer. The autoclave is then closed, evacuated and again purged with nitrogen three times. Following this procedure, the autoclave is charged with the desired amount of polymerizable monomer. The temperature is raised as specified, and the monomer is left in contact with the fabric for the time indicated. Thereafter, excess monomer is bled off, fabric samples are removed and Soxhlet extracted for 24 hours, removing extraneous reagents. After drying, the weight gain is determined.

Table 15

| Sample | Monomer | Dose | Liquid composition in autoclave | Reaction conditions | | | Extraction solvent | Weight gain, percent |
|---|---|---|---|---|---|---|---|---|
| | | | | Time, hrs. | Temp., °C. | Press., p.s.i.g. | | |
| 18A | Acetylene | 10 | Acetone | 18 | 50 | 200 | Xylene | 4.8 |
| 18B | Ethylene | 25 | None | 7 | 80 | 13,200 | ____do | 9.2 |
| 18C | Propylene | 10 | 300 g. propylene | 18 | 50 | ND | ____do | 1.3 |
| 18D | Isobutylene CO | 10 | 280 g. isobutylene, 65 g. CO, 2 ml. ethyl acetate. | 18 | 26 | ND | Methylethyl ketone. | 2.3 |

Sample 18B is observed to be more water-repellant than the original ungrafted nylon.

Items indicated by the term ND indicate variables not determined.

The process of the instant invention is useful not only for grafting coatings to polymeric substrates, but also in achieving a graft modification to at least a substantial depth in the body of the polymer substrate, i.e. a bulk modification. The depth of grafting may be controlled by varying reagent concentration, time of contact with the monomer, and temperature during the grafting reaction. The effect of varying contact time and temperature is shown by the following example.

EXAMPLE XIX

Samples of polyhexamethylene adipamide yarn are cooled to −80° C. on Dry Ice, and irradiated with 2 mev. electrons to a dose of 1 Mrad, while maintained at this temperature. A standard 8.60% aqueous solution of acrylic acid in water is used in these tests. The acrylic acid used in preparing the solution contains 0.007% methyl hydroquinone polymerization inhibitor. Portions of the irradiated, chilled yarn are dropped into the acrylic acid solution at the temperatures indicated in Table 16. At the end of the specified time interval, the samples are removed, washed repeatedly in distilled water and dyed using a basic dye (such as C.I. Basic Red 14). The filaments are then examined in cross section; the depth of grafting is shown by the depth of deep dyeing. The radial penetration under each condition is listed in the table, along with the test conditions under which it is obtained. The average diameter of the filaments used in this test is 0.033 mm.

Table 16

[Depth of Grafting, Nylon Filaments (Dia., 0.033 mm.)]

| Exposure temperature, ° C | 25 | 50 | 75 |
|---|---|---|---|
| Time of contact, min.: | | | |
| 2 | | [1]1.0 | 2.0 |
| 5 | 0.2 | 2.2 | 5.1 |
| 10 | 0.4 | 4.3 | Complete |
| 20 | 0.8 | Complete | Complete |
| 100 | 3.7 | Complete | Complete |

[1] Depth of graft, measured along fiber radius, in millimeters ×500.

From the above data, it is seen that where complete penetration is needed, in general this can be readily accomplished by increasing the exposure temperature

EXAMPLE XX

A rectangle of commercial cellophane (plasticized with glycerol) is placed in a test tube and evacuated at 0.05 mm., then is irradiated as in Example I at Dry Ice temperature to a dose of 5 Mrad. The sample tube is connected to a manifold which in turn leads to a reservoir containing deaerated vinyl acetate. When the connection is opened, vinyl acetate vapors are drawn into contact with the cellophane. The sample is left in contact with the monomer vapor for three days at room temperature, and is then re-evacuated to remove any unattached monomer. The sample is found to have gained 2.0% in weight.

EXAMPLE XXI

Carnauba wax is melted and spread on the inside of a test tube, forming a film approximately 80 mils thick. The test tube is evacuated for 24 hours and is then irradiated for 40 Mrad at Dry Ice temperature. Following the irradiation, the tube is re-evacuated and is then connected to a manifold joined to a reservoir containing deaerated acrylonitrile. After standing 4 days at room temperature, the tube containing the wax is re-evacuated, and weighted. It shows a weight gain of 28.3%. The grafted product is largely insoluble in hot heptane, whereas the original material is soluble. Analysis of the product shows 16.12% nitrogen, and microscopic examination shows that the wax has a porous, fibrous, spongey structure.

EXAMPLE XXII

An ethylene-sulfur dioxide copolymer is prepared according to the process described in U.S. Patent 2,507,526, using water as a polymerization medium. The polymer, in the form of a finely comminuted powder, still wetted by the water in which it was prepared, is placed in a polyethylene bag which is evacuated and flushed three times with nitrogen. The bag is pressed to a thickness of about 0.7 cm., and is irradiated at Dry Ice temperature with a dose of 80 Mrad, using 2 mev. electrons. After storing for 2 hours on Dry Ice, the irradiated polymer is placed in an excess of vinyl acetate monomer at room temperature. The mixture is then heated and refluxed for 24 hours under nitrogen. Following this treatment, the mixture is diluted with half its volume of ethanol, solids are filtered off, followed by centrifuging and air drying; the product shows a weight gain of 7%.

EXAMPLE XXIII

A film of polyvinyl fluoride 2 mils thick is placed in a tube, evacuated, and irradiated to a dose of 5 Mrad at Dry Ice temperature. It is then connected to a reservoir containing ethylcyanoacrylate (prepared according to the process of Example I of U.S. Patent 2,649,927). The film is kept in contact with the vapors for 3 days at room temperature following which it is extracted with acetone to a constant weight. The weight gain is 1.4%. The modified film could be adhered to paper using a cyanoacrylate adhesive, such as that sold by Eastman Kodak Company as Eastman No. 910. Adhesion is improved over that of an untreated control.

EXAMPLE XXIV

A 2 mil film of polytetrafluoroethylene is placed in a test tube and evacuated to 0.01 mm., and is then irradiated with 2 mev. electrons at Dry Ice temperature to a dose of 40 Mrad. The sample is then exposed to the vapors of deaerated vinyl acetate for 3 days at room temperature following which it is re-evacuated and then extracted to constant weight with ethanol. A weight gain of 33% is observed. The film has improved adhesion to paper, as compared to an unmodified control, when using polyvinyl acetate adhesive.

EXAMPLE XXV

A 5 mil film of polyvinyl fluoride is placed in a test tube, evacuated at 0.05 mm. for 18 hours and is then sealed. The sealed tube is cooled at Dry Ice temperatures and irradiated for one pass under the 2 mev. Van de Graaff electron accelerator, at a beam-out current of 25 microamperes, which produces a dose of 0.1 Mrad. The tube is then connected to a vacuum manifold attached to a reservoir of liquid acrylonitrile cooled in Dry Ice. The tube and manifold are evacuated, closed off from the pump, the reservoir and tube are warmed at room temperature and are allowed to stand in this condition for 18 hours. The film is removed from the tube, excess monomer is eliminated by gentle warming, and the sample is weighed; a weight increase of 8.7% is noted.

EXAMPLE XXVI

A swatch of polyhexamethylene adipamide fabric is laid on a bed of Dry Ice for 1 hour, attaining a temperature of about −80° C. The swatch is then irradiated while on the Dry Ice with 2 mev. electrons to a dose of 0.02 Mrad. After the irradiation, the swatch is dropped into a bottle containing 40% aqueous inhibitor-free acrylic acid. Nitrogen is bubbled through the solution for 2 hours at room temperature. Following this exposure, the fabric swatch is removed and extracted with distilled water in a Soxhlet extractor for 24 hours followed by a rinse in distilled water at 70° C. The swatch is then dried over $P_2O_5$ and weighed. A weight gain of 9.6% is observed; an identically treated duplicate gained 9.8%. Similarly treated non-irradiated controls show a weight gain of 0.3 and 0.0%.

MODIFIERS

Suitable modifiers are those which have aliphatic unsaturation, and which are homopolymerizable, or are copolymerizable when used in combination with one or more other vinyl monomers. Thus, suitable monomers include hydrocarbons such as ethylene, propylene, styrene, alpha-methyl styrene, divinyl benzene, 1,3-butadiene, 2,3-dimethyl-1,3-butadiene, 2-chloro-2,3-butadiene, isoprene, cyclopentadiene, chloroprene; acids such as maleic acid, crotonic acid, dichloromaleic acid, furoic acid, acrylic acid, methacrylic acid, undecylenic acid, cinnamic acid; amides such as acrylamide, methacrylamide, N-methylolacrylamide, N-methyl-N-vinyl formamide, N-vinyl pyrrolidone, vinyl oxyethyl formamide, methylene-bis-acrylamide, N-allylcaprolactam; acrylate esters such as methyl acrylate, ethyl acrylate, benzyl acrylate, octyl acrylate, methyl methacrylate, butyl methacrylate, vinyl acrylate, allyl acrylate, ethylene di-acrylate, diallyl itaconate, diethyl maleate, N,N-diethylaminoethyl methacrylate, dihydroxy dipyrone; nitriles such as acrylonitrile, methacrylonitrile; acrylyl halides such as acrylyl chloride; vinylic alcohols such as allyl alcohol, furfuryl alcohol, 3-hydroxycyclopentene, dicyclopentenyl alcohol, tropolone; aldehydic compounds such as acrolein, methacrolein, crotonaldehyde, furfural, acrolein diethyl acetal; vinyl amines such as vinyl pyridine, allyl amine, diallyl amine, vinyloxyethylamine, 3,3-dimethyl-4-dimethylamino-1-butene, N,N-diacryltetramethylene diamine, N,N-diallyl melamine, diamino octadiene; quaternized amines such as tetraallyl ammonium bromide, vinyl trimethyl ammonium iodide, the quaternary methiodide of methylene-3-aminomethylcyclobutane; vinyl esters such as vinyl acetate, vinyl salicylate, vinyl stearate, allyl formate, allyl acetate, diallyl adipate, diallyl isophthalate; vinyl ethers such as allyl glycidyl ether, vinyl 2-chloroethyl ether, dihydropyrane, methoxy polyethyleneoxymethacrylate; vinyl halides such as vinyl chloride, vinyl fluoride, tetrachloroethylene, tetrafluoroethylene, 1,1-dichloro-2,2-difluoroethylene, vinylidene chloride, hexachloropropene, hexachlorocyclopentadiene, p-chlorostyrene, 2,5-dichlorostyrene, allyl bromide, 2-bromoethyl acrylate, vinyl tetrafluoropropionate, 1,1,7-trihydro perfluoroacrylate; isocyanate type compounds such as vinyl isocyanate, acrylyl isocyanate, allyl isothiocyanate; vinyl ketones such as methyl vinyl ketone, ethyl vinyl ketone; cyanides such as methacrylyl cyanide, allyl isocyanide; nitro compounds such as 2-nitropropene, 2-nitro-1-butene; phosphorous containing vinyls such as diethyl vinyl phosphate, diphenyl vinyl phosphine oxide, 1-phenyl-3 phosphacyclopentene-1-oxide, diallyl benzene phosphonate, potassium vinyl phosphonate, bischloroethyl vinyl phosphonate; also included are alkyl, aryl, aralkyl phosphonates, phosphites and phosphonates; sulfur containing vinyls including sulfonates, sulfonamides, sulfones, sulfonyl halides, thiocarboxylates, such as diallyl sulfide, ethylene sulfonic acid, allyl sulfonic acid, methallyl sulfonic acid, styrene sulfonic acid, 2-methylpropene-1,3-disulfonic acid, also including salts and esters of the sulfonic acids; epoxy vinyls, such as butadiene oxide, 1,2-diisobutylene oxide, glycidyl methacrylate.

Acetylenes such as phenylacetylene, acetylene dicarboxylic acid, propiolic acid, propargylsuccinic acid, propargyl alcohol, 2-methyl-3-butyn-2-ol, 2,2,3,3-tetrafluorocyclobutylvinylethyne and the like may be used successfully.

For grafting onto polyamides, vinyl monomers with positively polarized (i.e., electron-releasing) double bonds (e.g., acrylic type) have a greater affinity for nylon than those which are negatively polarized (i.e., electron-attracting, as e.g., vinyl acetate). The polarity of double bonds is discussed by Mayo and Walling, Chemical Reviews, 46, 191 (1950). Therein it is disclosed that in vinyl copolymerization, free radicals and vinyl monomers have greatest affinity (and consequently greatest mutual reactivity) when their reactive sites are oppositely polarized. It appears that this principle holds for the process of this invention, i.e., the vinyl monomers most reactive toward a given polymer substrate are those which have a bond polarization of opposite sign to that of the free radicals formed by the irradiation of said substrate. (See also "Principles of Polymer Chemistry," Flory, Cornell University Press, 1953, p. 197.)

RADIATION WHICH IS EFFECTIVE

The ionizing radiation useful in the process of this invention must have at least sufficient energy to nonselectively break chemical bonds. This radiation is to be distinguished from ultraviolet radiation, which is effective in activating or ionizing only specific chemical bonds; such bonds are responsive to ultraviolet radiation only of a given wave length or wave lengths. It is often necessary to use an ultraviolet photo-initiator in such reactions, so that light of available wave lengths will initiate the desired chemical reaction. In contrast, the ionizing radiation of this invention has sufficient energy so that it exceeds that which is required to break any chemical bond. Thus, this ionizing radiation serves to activate polymer substrates so that chemical reactions are initiated with any vinyl monomer.

In general, ionizing radiation is preferred which has sufficient energy so that appreciable substrate thickness is penetrated, and in addition radiation absorption by the atmosphere is sufficiently low so that it is unnecessary to operate in a vacuum. Such radiation has energy of at least 0.1 mev. Higher energies are even more effective; the only known upper limit is imposed by available equipment.

The ionizing radiation of the process of this invention is generally considered in two classes: particle radiation, electromagnetic radiation. Effects produced by these two types of radiation are similar, since in their interaction with matter, each generates secondary radiation of the other type. The important consideration is that the incident radiation exceed a minimum threshold energy. Details of the mechanism of the interaction of high energy electrons with organic matter, including polymers, are not completely known, but the initial reaction may be considered to be the absorption of energy by the valence electrons of the irradiated molecules in or near the path of the high energy electrons. The absorbed energy may be so great that some valence electrons will be shot off fast enough to ionize still other molecules. Some of the displaced electrons fall back to form neutral molecules and give up their energy as electromagnetic irradiation, which in turn can be absorbed by other molecules and raise them to an excited stage. Further redistribution of the energy in the molecules results primarily in splitting off of H atoms producing free radicals or unstaturation.

The similarity of effect between the two types of radiation is thought to be due to the fact that an electron is ejected when an atom absorbs a quantum of high energy X- or gamma rays; the electron has sufficient energy so that it in turn ejects electrons from other atoms, corresponding in effect to irradiation with an electron beam. Thus, the initial effect of high energy irradiation is to produce high energy electrons, which within the irradiated substrate produce free radicals. Consequently, the effects produced by particle and electromagnetic irradiation of equivalent energy are very similar, and differ only in the rate at which the effect is producer, which is a function of dose rate. The dose rate is a function of the equipment available to produce it, rather than an inherent limitation of the type of irradiation. Thus, with present day equipment, higher dose rates are obtainable with electron irradiation than are obtainable with X-rays of equivalent energy.

Although the fundamental particles differ from one another in size and charge their mechanism of energy loss is essentially the same. Thus, their effects on chemical reactions is also similar. Although the neutron is not a charged particle, it however produces protons and gamma-rays which lose energy in the normal ways and consequently is effective in the process of this invention.

The heavier charged particles, like the electrons, undergo inelastic collisions with the bound electrons of atoms which they eject to produce ions. Some of these ejected electrons may be sufficiently energetic to produce ionizations of their own. The energy of all these particles is used up in removing the bonded electron (i.e., in ionization) and in producing excited atoms until all the electrons have become of such low energies that they can no longer produce ionizations and are captured to form negative ions. Neutrons do not produce ionization directly but knock out protons from the nucleus of the atoms they traverse. The chemical effects of fast neutrons are, therefore, almost wholly due to protons in exactly the same way as the effects of X-rays are produced by the ejected electrons. Unlike the other ionizing radiations, however, the number of ionizations produced by neutrons depends largely on the nature of the elementary composition of the material through which the neutrons pass. The reason for this is that the transfer of energy between neutrons and protons does not depend on the atomic number but on other factors, such as chemical composition of the absorbing material.

Therefore, the high energy particle radiation effective in the process of this invention is an emission of highly accelerated electrons or nuclear particles such as protons, neutrons, alpha particles, deuterons, beta particles, or the like, directed so that the said particle impinges upon the polymer. The charged particles may be accelerated to high speeds by means of a suitable voltage gradient, preferably at least 0.1 mev., using such devices as a resonant cavity accelerator, a Van de Graaff generator, a betatron, a synchrotron, cyclotron, or the like, as is well known to those skilled in the art. Neutron radiation may be produced by bombardment of selected light metal (e.g., beryllium) targets with high energy positive particles. In addition, particle radiation suitable for carrying out the process of the invention may be btained from an atomic pile, or from radiocative isotopes or from other natural or artificial radioactive materials.

Similarly, ionizing electromagnetic radiation useful in the process of this invention is produced when a metal target (e.g., gold or tungsten) is bombarded by electrons possessing appropriate energy. Such energy is imparted to electrons by accelerating potentials in excess of 0.1 million electron volts (mev.). Such radiation, conventionally termed X-ray, will have a short wave length limit of about 0.01 Angstrom units (in the case of 1 mev.) and a spectral distribution of energy at longer wave lengths determined by the target material and the applied voltage. X-rays of wave lengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases the radiation is conventionally termed gamma-rays. While gamma radiation is distinguished from X-radiation only with reference to its origin, it may be noted that the spectral distribution of X-rays is different from that of gamma-rays, the latter frequently being essentially monochromatic, which is never the case with X-rays produced by electron bombardment of a target.

RADIATION ENERGY

To be efficient in the practice of the present invention, it is preferred that the high energy particles have sufficient velocities to permit penetration of several layers of material, when fabrics or films are being treated. Although an energy of about 50 mev. is enough to initiate the grafting reaction, energies of at least 0.1 mev. are preferred, for efficient penetration. The velocity required will depend on the nature of the particle and also on the nature of the substrate to a certain extent. An electron which is accelerated by a potential of a million volts (mev.) will effectively penetrate a thickness of polyhexamethylene adipamide fabric of about 0.25 cm. A more universal measure of penetration for all substrates is in units of grams penetrated per square centimeter irradiated. Thus, 2 mev. electrons will effectively penetrate 0.7 gm./cm.$^2$ of any shaped article, which 1 mev. electrons are effective for 0.35 gm./cm.$^2$.

As stated previously, there is no known upper limit to the particle energy, except that imposed by present day equipment. Thus, energies equivalent to 24 mev. to 100 mev. may be used.

As a guide in using other charged particles which have been shown to be effective in grafting, Table 17 shows particle energies required to give penetration equivalent to 0.1 mev. electrons.

*Table 17*

| Particle: | Accelerating potential, mev. |
|---|---|
| Electron, e | 0.1 |
| Proton, H$^+$ | 3.0 |
| Deuteron, D$^+$ | 4.0 |
| Alpha, He$^{++}$ | 12.0 |

It should be recognized that the heavier charged particles are especially adapted to creating surface effects, due to their lower penetration at a given energy. In situations where surface effects are paramount, it is not necessary that the shaped article be completely penetrated by the high energy particle and lower accelerations may be employed. Under these conditions, if the surface effect is to be applied to both sides of the shaped article, it will obviously be necessary to expose each of the surfaces to the particle radiation. This is done by simultaneously bombarding both sides of the shaped article or alternatively by subjecting each side to the single source of irradiation during different runs.

High energy particle radiation has special utility for grafting modifiers to thin substrates, e.g., fabrics, filaments and films. The required irradiation doses with present day electron accelerators, such as exemplified herein, are attained rapidly, in a matter of seconds, thus promoting a high rate of throughput.

In comparison, high energy electromagnetic radiation in short wave lengths is highly penetrating, and hence readily lends itself to treating massive substrates. When grafting to the preferred substrates of this invention, this type of radiation is especially useful for irradiating materials present in multiple layers. For example, rolls of film, bolts of fabric, yarn packages, bales of staple fiber, or the like, may be irradiated as a single unit.

As an illustration, X-rays generated by electrons of 2 mev. have adequate penetration for polymer samples of several inches in thickness. Lower energy (longer wave length) X-rays are of course less penetrating, so that it may be necessary to reduce the thickness of material to be treated simultaneously. In addition, the very long (soft) X-rays because of low penetration may be especially effective in producing surface effects.

Although the treatment can be carried out using conventional X-ray equipment, the use of radioactive isotopes such as cobalt 60 is especially economical. Radiation from waste fission products, with particle irradiation screened off if desired, is also effective and offers an opportunity to utilize an otherwise useless waste product.

RADIATION DOSE

The radiation dose required to activate a polymeric substrate depends somewhat on the substrate irradiated and the amount of grafting required, as shown in the examples. For readily graftable polymer-monomer combinations, such as polyhexamethylene adipamide and acrylic acid, doses as low as 0.005 Mrad (at −80° C.) may be employed to initiate a significant amount of grafting. Since the relation between dose and amount grafted modifier is substantially linear at low dosage under constant reaction conditions (inhibitor and reagent concentration, presence of O$_2$, contact time and temperature, etc.), a dose of 0.02 Mrad is about four times as effective. Higher doses are generally to be preferred, since this contributes to increased material throughput, or avoids the necessity of removing the polymerization inhibitors from the monomer. Higher temperatures for irradiation or post-irradiation storage, less reactive monomers, excessive amounts of polymerization inhibitors, or radiation resistant polymers will require higher doses. As a guide, radiation doses of from 0.1 to 100 Mrad are generally recommended for activating polyamides, polyesters, polyvinyls (excepting the vinyl halides), silk and wool, with the preferred range 1 to 10 Mrad. A lesser exposure (to avoid decomposition) is advantageous for the polyvinyl halides and the cellulosics (cotton, cellulose acetate, etc.), 0.05 to 5 Mrad being useable, and 0.1 to 5 preferred.

Radiation intensity (dose rate) used to activate the polymer substrate is not limited to the tube current (250 microamperes) exemplified. This is an equipment limitation. Higher intensities may be employed provided the substrate temperature is not raised to the point that decomposition, oxidation or discoloration or loss of free radical activity occurs. It is preferred that the surface temperature of a polymer irradiated in air not rise more than about 10° C. above its environment. More latitude in this respect is permissible at lower irradiation temperature (e.g., −80° C.) than at higher (e.g., 0° C.) temperatures.

IRRADIATION TEMPERATURE

While the irradiation step in most of the examples is conducted at Dry Ice temperatures (−80° C.), temperatures as high as about 10° C. can be used. With increase in temperature some loss in the duration of substrate activity is noted, however. In order to operate with reasonable efficiency, it is usually preferred to irradiate and store the activated substrate, before contacting with the vinyl monomer, at temperatures of about 0° C. or lower.

PROPERTIES MODIFIED

As exemplified herein, the antistatic properties of polymeric substrates can be improved by the process of this invention. Other desirable properties can be achieved as well by choosing the proper reactants. For example, the attachment of vinyl triethoxy silane increases the water repellancy of the sustrate. The attachment of chlorine containing agents increases resistance to burning. Dyestuffs containing vinyl unsaturation can react with irradiation activated substrates to give desirable color. Other modifying agents may be employed upon textiles to affect softness, resilience, tendency to shrink, static propensity, dyeability, resistance to hole melting pilling, hydrophilicity, wickability, and the like. Furthermore, such properties as tenacity, elongation, modulus, creep, compliance ratio, work recovery, tensile recovery, decay of stress, wet properties, high-temperature properties, abrasion and wear resistance, moisture regain, flex life, hydrolytic stability, heat-setting properties, boil-off shrinkage, dry-cleaning properties, heat stability, light durability, zero strength temperature, melting point, soilability, ease of soil removal, laundering properties, liveliness, crease resistance, torsional properties, hysteresis properties, fiber friction, dyeability (depth, rate, permanence and uniformity), printability, washfastness of dyes or finishing treatments (resins, ultraviolet absorbers, etc.), handle and drape properties (stiffening or softening), pilling, heat-yellowing, snag resistance, elasticity, density, ease in textile processability, solubility (insolubilization or increase in solubility), bleachability, surface reactivity, delustering action, drying properties, fabric life, crimpability, stretchability, fabric stabilization, compressional resilience (rugs), thermal and electrcal conductivity, transparency, light transmittance, air and water permeability, fabric comfort, felting, ion exchange properties, adhesion, over-all appearance and combinations of these as well as others may be varied by following the technique of the present invention.

In adition to the above modifications which it may be desirable to effect in fibrous articles, there are modifications which would be particularly useful in other substrates, for example, in films. By way of illustration, polymeric films may be modified to improve adhesion to various coating or laminating agents which it may be desirable to adhere thereto, to change "slip" or the ease with which one film slides over another, to produce non-reflective or decorative coatings on film or sheet, to improve the ease of printing colors on such sheet and many other modifications such as will readily suggest themselves to one skilled in the art. The invention may be employed to improve the oil resistance of rubber.

The practice of this invention includes not only the attachment of single monomeric materials to the activated substrate but also the attachment of two or more monomeric compounds. In some cases the attachment of monomeric vinyl compound to the activated substrate may simultaneously serve to adhere a third substance so that it is substantially wash fast, even though said third substance (not a vinyl monomer) would not otherwise react with the substrate. For example, methylene blue is attached to irradiated nylon when potassium acrylate is reacted therewith. The methylene blue is dissolved in the monomer and both are applied to the radiation-activated substrate.

Many equivalent modifications will be apparent to those skilled in the art from a reading of the above without a departure from the inventive concept.

This application is a continuation-in-part of U.S. application Serial No. 570,203, filed March 5, 1956, and U.S. application Serial No. 570,388, filed March 8, 1956, both now abandoned.

What is claimed is:

1. A process for the formation of an addition polymer upon a shaped organic polymer substrate which comprises subjecting the said substrate to ionizing radiation of sufficient dosage and intensity to provide energy to nonselectively break chemical bonds, the said dosage being at least about 0.005 Mrad at a temperature no higher than about 10° C., contacting the said substrate with an organic compound capable of addition polymerization and thereafter graft copolymerizing the said organic compound to the said polymer substrate by exposing the said substrate bearing the said organic compound to a temperature between about room temperature and about 100° C., at which latent free radicals become activated and initiate polymerization.

2. The process of claim 1 wherein the said organic compound is contacted with the said substrate until a deep-seated penetration of the said substrate with the organic compound occurs prior to graft copolymerization.

3. The process of claim 1 wherein the substrate is produced from polyhexamethylene adipamide.

4. The process of claim 1 wherein the substrate is produced from polyethylene terephthalate.

5. The process of claim 1 wherein the substrate is produced from polyethylene.

6. The process of claim 1 wherein the substrate is produced from polyacrylonitrile.

7. The process of claim 1 wherein the said organic compound is a styrene sulfonate.

8. The process of claim 1 wherein the said organic compound is an acrylate.

9. The process of claim 1 wherein the said organic compound is vinyl acetate.

10. The process of claim 1 wherein the shaped organic polymer substrate is filamentary.

11. The process of claim 1 wherein the shaped organic polymer substrate is a film.

References Cited in the file of this patent

UNITED STATES PATENTS

| | | |
|---|---|---|
| 2,897,092 | Miller | July 28, 1959 |
| 2,921,006 | Schmitz et al. | Jan. 12, 1960 |
| 2,940,869 | Graham | June 14, 1960 |

OTHER REFERENCES

"Chemical Activity of Polymethyl Methacrylate Previously Exposed to Gama-Radiation," by Wall, Modern Plastics, vol. 3L, No. 10, pages 159 and 252 relied on (pub. date June, 1955).

Wall: "Atomic Radiation and Polymers," Office of Naval Research, Report ACR–2, pages 138–148, esp. 147 and 148, Conference on Effects of Radiation on Dielectric Materials, Nov. 1, 1955.